Patented June 24, 1930

1,766,305

UNITED STATES PATENT OFFICE

GRIGORI PETROFF, OF MOSCOW, UNION OF SOVIET SOCIALIST REPUBLICS

PROCESS FOR TREATING MINERAL AND NAPHTHA OILS

No Drawing. Application filed April 23, 1927, Serial No. 186,181, and in Union of Soviet Socialist Republics November 8, 1926.

The difference between the process forming the subject matter of the present invention and those hitherto known is that the mineral oils are exposed together with the fats (glycerides) or fatty acids dissolved therein to the action of concentrated or fuming sulphuric acid, of the monohydrate or the anhydride.

The presence of the fats or their acids in the oils to be purified results in: (1) A more complete reaction between the unsaturated naphtha-hydrocarbons and the sulphuric acid; (2) a more satisfactory elimination of the resinous constituents when left to stand; (3) the removal of the acid compounds. In addition the oils containing acids, after being purified in the presence of fats or fatty acids, in consequence of the sulphonated acids left behind in the distillate, are easily purified by alkalies and the free sulpho-acids can be readily separated from the acid residues (acid tarry matter) simply by heating with water.

The present process is of practical importance more especially in the production of transformer or turbine oils, the white vaseline oils, the deodorizing of light oils such as benzine, petroleum, particularly richer with aromatic hydrocarbons.

*Example 1.*—100 parts by weight of vaseline oil of spec. grav. 0.896, treated with 5% of the monohydrate, are mixed with 5% oleic acid and sulphonated by the gradual addition of 20% concentrated sulphuric acid. After the reaction has ended, the black tarry matter is allowed to settle out of the oil. The acid tarry matter is mixed with water, the sulphonic acids are separated and the oil washed with alkali.

*Example 2.*—100 parts of petroleum with 15 parts of stearic acid dissolved therein are treated with 50 parts of fuming sulphuric acid or with $SO_3$ or with both together. After being washed with alkalies, the petroleum loses its characteristically unpleasant smell.

By mineral oils I mean to include those substances derived from petroleum or petroleum itself.

Having now particularly described and ascertained the nature of my said invention and in what manner the same is to be performed, I declare that what I claim is:—

1. The process of purifying mineral oils which comprises adding thereto a minor quantity of fatty material of the class including high molecular weight fatty acids and their glycerides and then treating the mixture with sulphuric acid.

2. In the process of treating mineral oils to purify and deodorize the same, the steps which comprise adding a minor quantity of a high molecular weight fatty acid to the oil to be treated and then treating the mixture with sulphuric acid.

3. The process of purifying and deodorizing mineral oils which comprises mixing a minor quantity of a fatty material of the class including high molecular weight fatty acids and their glycerides with the oil, subjecting the mixture to the action of sulphuric acid, separating the purified oil from the sulphonic acids formed and then treating the purified oil with an alkali.

In testimony whereof I have signed my name to this specification.

GRIGORI PETROFF.